(12) United States Patent
Michael et al.

(10) Patent No.: US 7,945,035 B2
(45) Date of Patent: May 17, 2011

(54) DYNAMIC PRESENCE PROXY FOR CALL SESSIONS

(75) Inventors: Michelle Michael, San Jose, CA (US);
Randy Wuerfel, Santa Clara, CA (US);
Jeffrey Blohm, Portola Valley, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 248 days.

(21) Appl. No.: 10/377,468

(22) Filed: Feb. 28, 2003

(65) Prior Publication Data
US 2004/0170263 A1 Sep. 2, 2004

(51) Int. Cl.
H04M 3/42 (2006.01)

(52) U.S. Cl. .................. 379/201.1; 379/201.01

(58) Field of Classification Search ............... 379/201.1, 379/93.01, 88.02, 201.01, 215.01, 201.06, 379/67.1; 709/206, 205, 204, 227; 707/4; 455/432.3; 370/349; 726/34
See application file for complete search history.

(56) References Cited

U.S. PATENT DOCUMENTS

| | | | |
|---|---|---|---|
| 5,471,616 A * | 11/1995 | Johnson et al. | 726/34 |
| 5,485,605 A * | 1/1996 | Johnson et al. | 707/4 |
| 5,509,010 A | 4/1996 | La Porta et al. | |
| 5,550,906 A | 8/1996 | Chau et al. | |
| 5,764,750 A | 6/1998 | Chau et al. | |
| 5,790,649 A | 8/1998 | Hiroshige | |
| 5,867,494 A | 2/1999 | Krishnaswamy et al. | |
| 5,867,495 A | 2/1999 | Elliott et al. | |
| 5,999,525 A | 12/1999 | Krishnaswamy et al. | |
| 6,020,916 A | 2/2000 | Gerszberg et al. | |
| 6,031,836 A | 2/2000 | Haserodt | |
| 6,111,924 A | 8/2000 | McKinley | |
| 6,144,670 A | 11/2000 | Sponaugle et al. | |
| 6,157,635 A | 12/2000 | Wang et al. | |
| 6,181,703 B1 | 1/2001 | Christie et al. | |
| 6,222,843 B1 | 4/2001 | Mauger | |
| 6,320,874 B1 | 11/2001 | Crump et al. | |
| 6,449,344 B1 | 9/2002 | Goldfinger et al. | |
| 6,549,937 B1 * | 4/2003 | Auerbach et al. | 709/206 |
| 6,658,095 B1 * | 12/2003 | Yoakum et al. | 379/93.01 |
| 6,690,780 B2 * | 2/2004 | Kotik et al. | 379/201.01 |
| 6,735,287 B2 * | 5/2004 | Vishik et al. | 379/88.02 |
| 6,853,634 B1 * | 2/2005 | Davies et al. | 370/349 |
| 6,879,677 B2 * | 4/2005 | Trandal et al. | 379/215.01 |
| 7,023,964 B2 * | 4/2006 | Matsumoto et al. | 379/67.1 |
| 7,076,043 B2 * | 7/2006 | Curbow et al. | 379/201.06 |

(Continued)

FOREIGN PATENT DOCUMENTS

WO WO 02/065250 8/2002

OTHER PUBLICATIONS

U.S. Appl. No. 09/104,885, filed Jun. 25, 1998, Sassin et al.

(Continued)

Primary Examiner — Thjuan K Addy

(57) ABSTRACT

A telecommunications system includes a telephone routing system; and a presence database manager unit operably coupled to the routing system and adapted to maintain one or more watcher lists of registered users. The routing system is adapted to receive phone calls and provide an indication to the presence database manager unit whether the phone calls originate from registered users. The presence database manager unit is adapted to determine if such a user has a watcher list and transmit an indication to parties associated with the watcher list that said user is present.

19 Claims, 5 Drawing Sheets

U.S. PATENT DOCUMENTS

| | | | |
|---|---|---|---|
| 7,162,237 B1 * | 1/2007 | Silver et al. | 455/432.3 |
| 2001/0025314 A1 * | 9/2001 | Matsumoto et al. | 709/227 |
| 2002/0147777 A1 * | 10/2002 | Hackbarth et al. | 709/205 |
| 2004/0003042 A1 * | 1/2004 | Horvitz et al. | 709/204 |

OTHER PUBLICATIONS

Tsuhan Chen, Video Coding and Multimedia Communications Standards for Internet, Electrical and Computer Engineering, Carnegie Mellon University, 5000 Forbes Avenue, Pittsburgh, PA 15213-3860, Submitted on Apr. 16, 2003.

A Primer on the H.323 Standard, XP_2152854A, A DataBeam Corporation White Paper, 17 pages total, Submitted on Apr. 16, 2003.

Gary A. Thom, Delta Information Systems Inc., H.323: The Multimedia Communication Standard for Local Area Networks, XP000636454, 5 pages total, Submitted on Apr. 16, 2003.

* cited by examiner

US 7,945,035 B2

DYNAMIC PRESENCE PROXY FOR CALL SESSIONS

BACKGROUND OF THE INVENTION

The present invention relates to telecommunications systems and, in particular, to an improved system and method for user presence.

Modern messaging systems, such as those based on the Session Initiation Protocol (SIP), provide presence capabilities, particularly in association with Instant Messaging systems. In presence server systems, a user typically maintains a buddy list or contact list of persons for whom presence information is desired. The presence server system in turn maintains one or more watcher lists of those who are watching a particular user and to whom that user's presence information is sent. When a user A logs in, a presence server identifies the logged in user as present and transmits the information to users on the watcher list of user A. The active users can then exchange instant messages with user A, and the like.

In order to update presence status in users' watcher lists, such systems, however, are dependent upon users logging into, and being logged in to, the system. If a user who is not logged in is listed on an active user's watcher list, an indication can be made on the active user's watcher list that the not logged-in user is not active. However, the presence status of the user is not updated until the user logs in, even if the not logged-in user is present, but engaged in another task not involving the system.

As such, there is a need for a system and method for more effectively providing presence information. There is a further need for a system and method for providing presence information for users who are not logged in to a presence system.

SUMMARY OF THE INVENTION

These and other drawbacks in the prior art are overcome in large part by a system and method according to embodiments of the present invention.

A dynamic presence proxy according to embodiments of the present invention monitors for not logged-in users accessing the system. If the dynamic presence proxy detects a user accessing the system, the user is identified as being present. The dynamic presence proxy then updates the presence status of the user.

A telecommunications server according to an embodiment of the present invention includes a telecommunications controller for supervising a presence system and a telephone switching system. The telecommunications controller is adapted to transmit presence information to the presence server about a party calling in via the telephone switching system without the calling party logging in to the presence system. In certain embodiments of the present invention, the presence system is an instant messaging and presence system.

A telecommunications system according to embodiments of the present invention includes a telephone routing system; and a presence database manager unit operably coupled to the telephone routing system and adapted to maintain one or more watcher lists of registered users. The telephone routing system is adapted to receive phone calls and provide an indication to the presence database manager unit whether the phone calls originate from registered users. The presence database manager unit is adapted to determine if such a user is being watched by another party and transmit an indication to such parties that the user is present.

A better understanding of these and other specific embodiments of the invention is obtained when the following detailed description is considered in conjunction with the following drawings.

DETAILED DESCRIPTION OF EMBODIMENTS OF THE INVENTION

Figure 1:
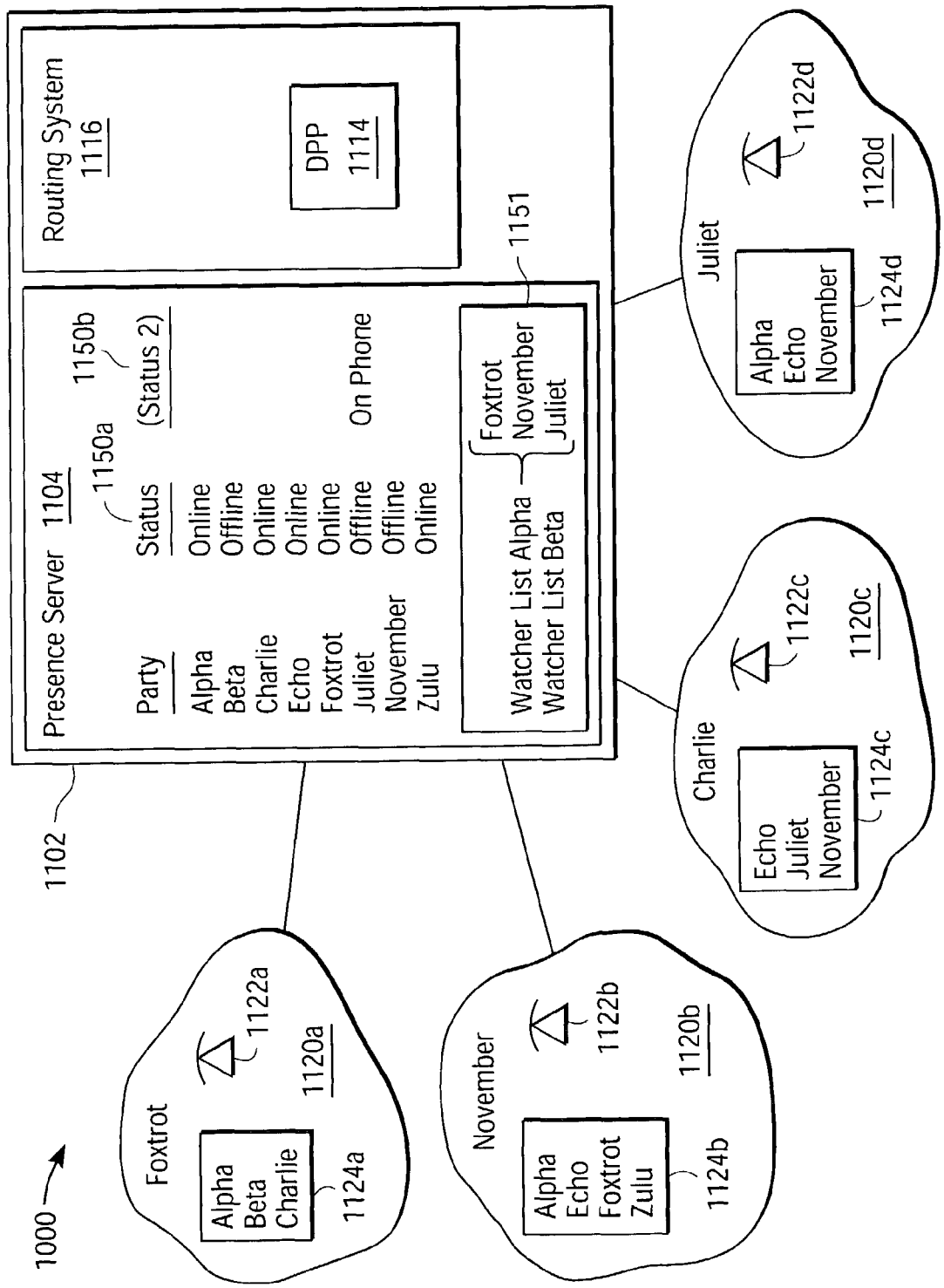
FIG. 1 is a diagram of a telecommunication system according to an embodiment of the present invention.

Turning now to the drawings and, with particular attention to FIG. 1, a diagram schematically illustrating an exemplary telecommunications system 1000 according to an embodiment of the present invention is shown. The telecommunications system 1000 includes a dynamic presence proxy 1114 adapted to monitor user access to monitored programs or to monitored call facilities, and adapted to transmit notifications to other parties watching the monitored user in response thereto.

Shown in FIG. 1 is an exemplary telecommunications server 1102 including one or more telecommunications controllers, such as a routing system 1116 and a presence server unit 1104 that maintains contact information for a plurality of users. The telecommunications server 1102 also includes a dynamic presence proxy 1114, as will be explained in greater detail below. The routing system 1116 may be embodied, for example, as a private branch exchange or IP telephony gateway or gatekeeper or other that operates as a telephony portal.

In the example illustrated, the presence server unit 1104 maintains presence information for users Alpha (online), Beta (offline), Charlie (online), Echo (online), Foxtrot (online), Juliet (offline and on the phone), November (offline), and Zulu (online). Also shown are a plurality of users 1120a (Foxtrot), 1120b (November), 1120c (Charlie), and 1120d (Juliet).

In the example illustrated, each user 1120a-1120d includes a telephone 1122a-1122d and a presence application maintaining contact lists 1124a-1124d. As shown, user 1120a (Foxtrot) has users Alpha, Beta, and Charlie on his contact list 1124a; user 1122b (November) has Alpha, Echo, Foxtrot, and Zulu on his contact list 1124b; user 1120c (Charlie) has Echo, Juliet, and November on his contact list 1124c; and user 1120d (Juliet) has Alpha, Echo, and November on her contact list 1124d. The presence server unit 1104 maintains watcher lists 1151 of those parties who are being watched by specific other parties. Thus, for example, the watcher list for user Alpha indicates that user Alpha is being watched by Foxtrot, November, and Juliet.

As noted above, users Charlie and Foxtrot are indicated to be online. Normally, this means that the users have logged in to the presence server unit 1104 and uploaded their presence states. Users Juliet and November, however, are offline. Thus, they have not logged in to their presence system. In operation, one of the offline users, such as Juliet, can use her phone 1122*d* to make a call, either to another user or to a remote party. The call is received at the routing system 1116, which provides a calling party identification to the dynamic presence proxy 1114. The dynamic presence proxy 1114 then interacts with the presence server unit 1104 and can then determine if the calling party is a presence user. If so, and the calling party is not logged in to the presence server, then the dynamic presence proxy 1114 can inform the presence server 1104 that the user is available and the presence server 1104 will then use the watcher lists 1151 to update the calling party's presence status and transmit the updated status to the logged in users that are monitoring Juliet's presence.

Figure 2:
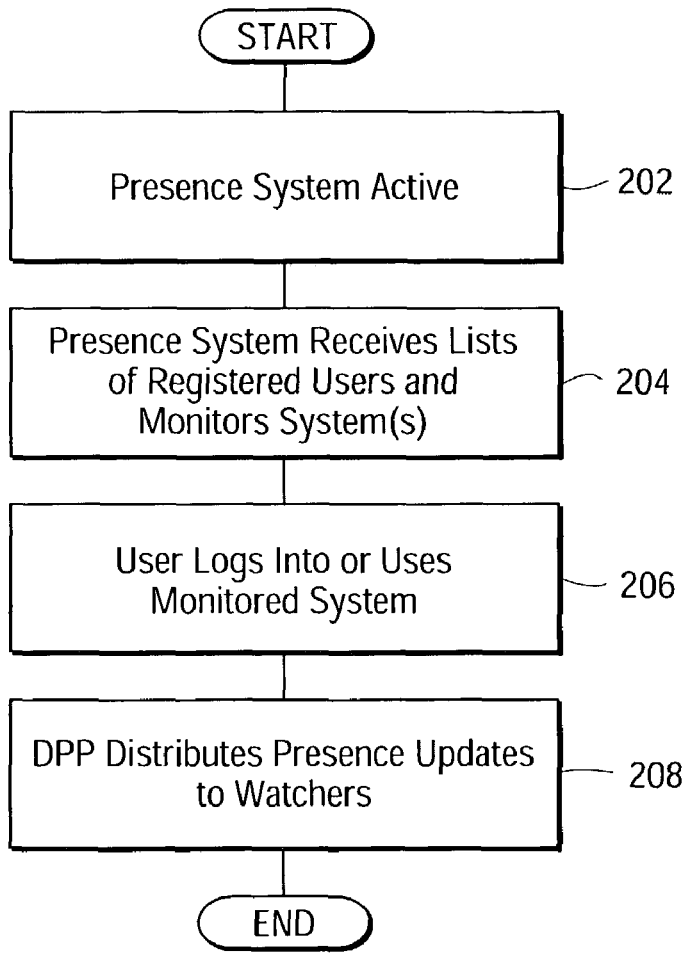
FIG. 2 is a flowchart illustrating operation of an embodiment of the present invention.

Operation of the embodiment of FIG. 1 is shown with reference to the flowchart of FIG. 2. At step 202, the presence server unit 1104 (FIG. 1) becomes activated. At step 204, the presence server unit 1104 receives watcher lists of registered, logged in users, and monitors the status of listed parties. For example, in FIG. 1, users Alpha, Charlie, Echo, Foxtrot, and Zulu are logged in and online. At step 206, a user who is not logged in the presence system nevertheless makes use of a monitored system. Thus, for example, user Juliet makes a phone call. The call is received at the routing system 1116 (FIG. 1). The routing system 1116 identifies the calling party and provides this information to the dynamic presence proxy 1114, which updates the logged in parties' presence, at step 208. In particular, the dynamic presence proxy 1114 communicates with the presence server unit 1104 with the identity of the calling party. The system determines that the calling party, Juliet, is a registered user but is not logged in to the presence system. The presence server unit 1104 updates the presence information to indicate that Juliet is on the phone, and then sends out the presence update to the logged in watching parties that are monitoring Juliet's presence. It is noted that in certain embodiments, the users can specify which watchers are authorized to receive their presence information. Thus, a check of authorization information may occur prior such to distribution of a presence update.

Figure 3:
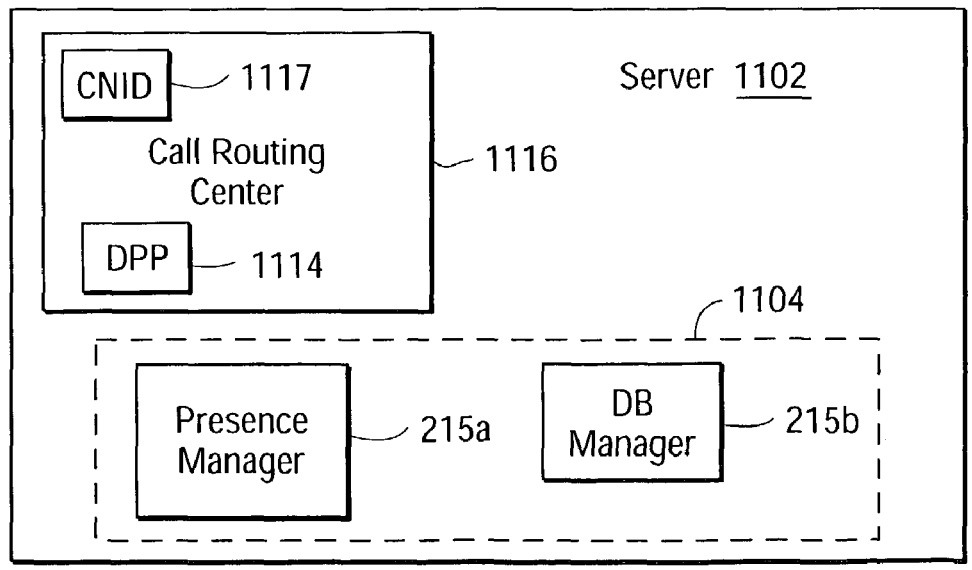
FIG. 3 is a diagram illustrating a telecommunications server according to an embodiment of the present invention.

A block diagram of an exemplary telecommunications server according to an embodiment of the present invention is shown in FIG. 3. In the embodiment illustrated, the telecommunications server 1102 includes one or more telecommunications controllers, such as routing system 1116, dynamic presence proxy 1114, and presence server unit 1104. It is noted, however, that in alternate embodiments, the presence server may be located remotely from the telecommunications server.

The presence server unit 1104 may be implemented as an Instant Messaging system and may include a presence manager unit 215*a* and a watcher list database manager unit 215*b*. The presence manager unit 215*a* receives presence information from registered users and their contact lists. The watcher list database manager unit 215*b* receives and coordinates the corresponding watcher list information.

For example, once a user has logged in and sent its contact list to the presence manager unit 215*a*, the watcher list database manager unit 215*b* determines who is watching whom and allows the presence manager unit 215*a* to provide the information to the parties on each list as to who is logged in and what their presence status is. The presence manager unit 215*a* or the watcher list database manager unit 215*b* may also maintain an authorization list or lists indicating parties who are authorized to receive other parties' presence information. In the embodiment illustrated, the routing system 1116 receives calls from remote users and identifies them, typically via a known calling number identification technique using calling number identification unit 1117. The dynamic presence proxy 1114 then receives the identification and accesses the watcher list database manager 215*b*. The dynamic presence proxy 1114 then uses the user's watcher list and updates the user's presence information. The presence manager unit 215*a* then transmits the updated presence information to the contact lists of the corresponding watchers of that user.

Figure 4:
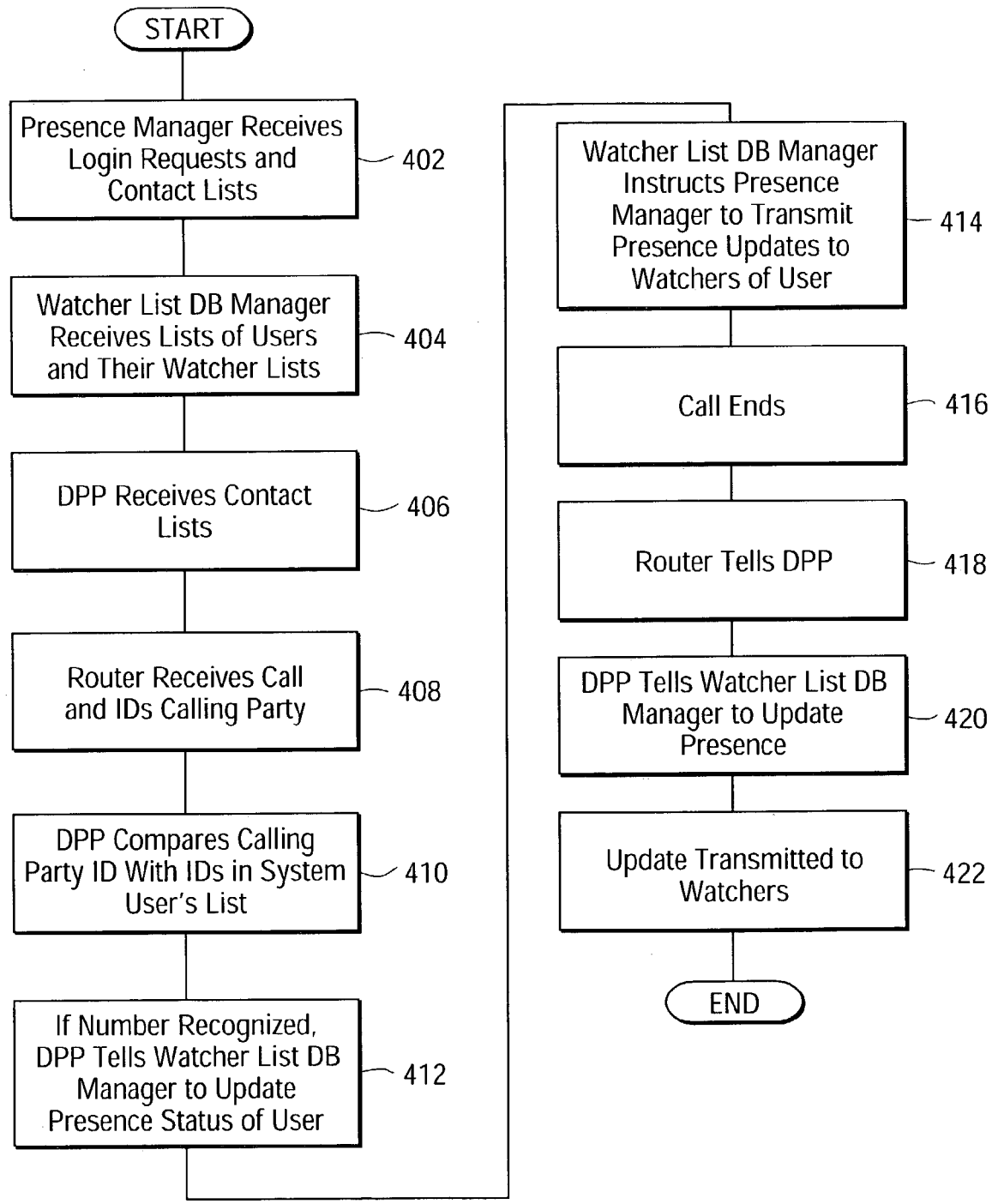
FIG. 4 is a flowchart illustrating operation of an embodiment of the present invention.

More particularly, FIG. 4 is a flowchart illustrating operation of an embodiment of the present invention and, in particular, an embodiment in which the monitoring system is a routing system (FIG. 3) such as a telephony routing system. It is noted that in other embodiments, the monitoring system can be any of a variety of shared systems, such as other forms of multimedia server or network server. In step 402, the presence manager unit 215*a* receives log in requests and contact lists of registered users. In step 404, the watcher list database manager 215*b* updates its lists with the presence status of the logged in users. In step 406, the dynamic presence proxy 1114 receives the list of users for whom telephony activity is to be monitored. This may be implemented using a predetermined default or through explicit user authorization. In step 408, the routing system 1116 receives a call and identifies the calling party number. In step 410, the dynamic presence proxy 1114 compares the calling party identification with the users being monitored. At step 412, if a calling party number is recognized, the dynamic presence proxy 1114 tells the watcher list database manager 215*b* to update the presence status of the caller identified. At step 414, the watcher list database manager 215*b* instructs the presence manager unit 215*a* to transmit the presence updates to the registered users on whose contact lists the calling party appears. In certain embodiments, the updates are provided only to users authorized by the calling party. At step 416, the call ends, for example, by the calling or called party hanging up. At step 418, the routing system 1116 tells the dynamic presence proxy 1114 that the call has ended. At step 420, the dynamic presence proxy 1114 again tells the watcher list database manager 215*b* to update its watcher list containing the caller. Finally, at step 422, the update is transmitted to the watchers.

Figure 5:
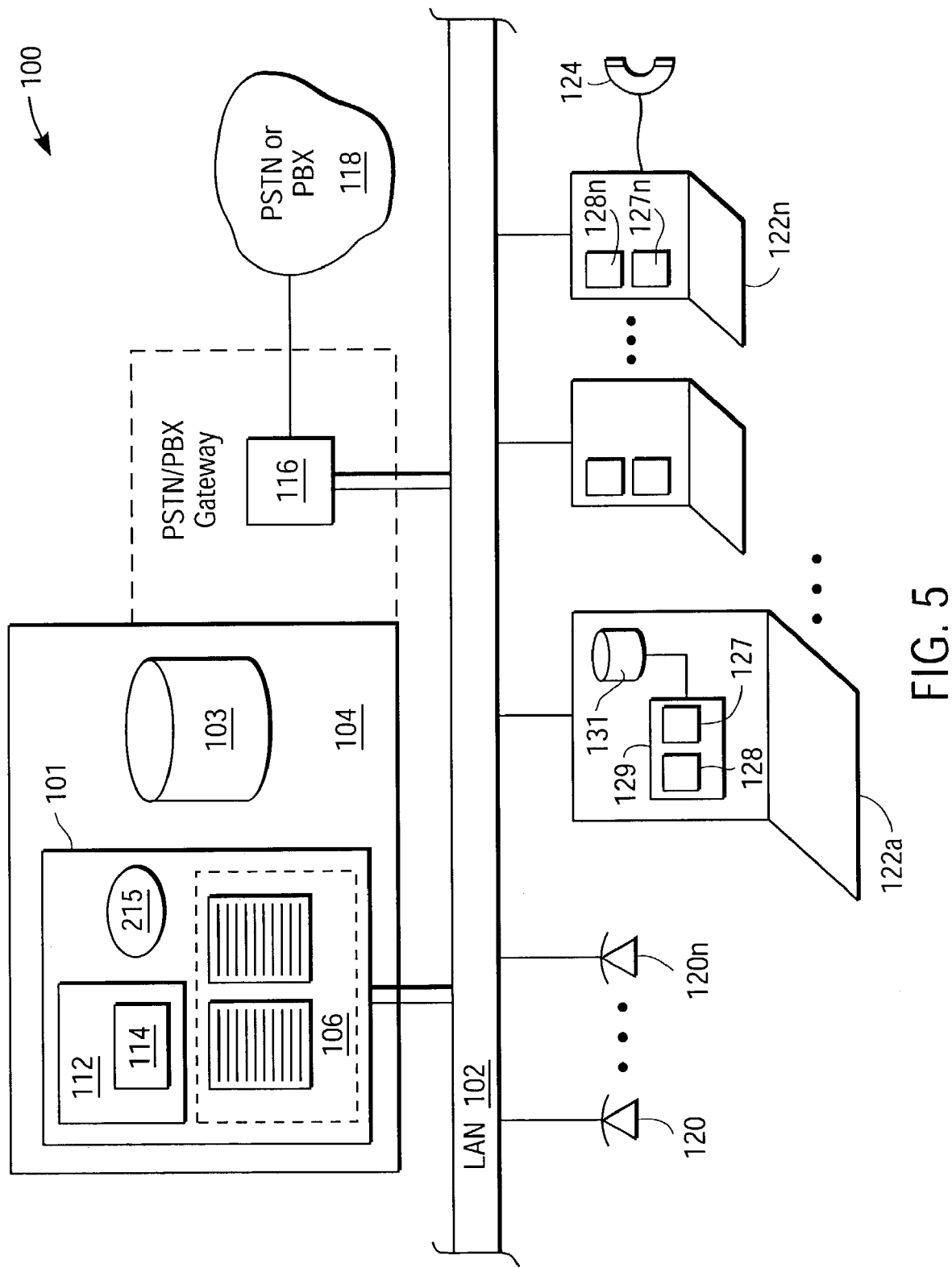
FIG. 5 is a diagram of a telecommunication system according to an embodiment of the present invention.
Figure 6:
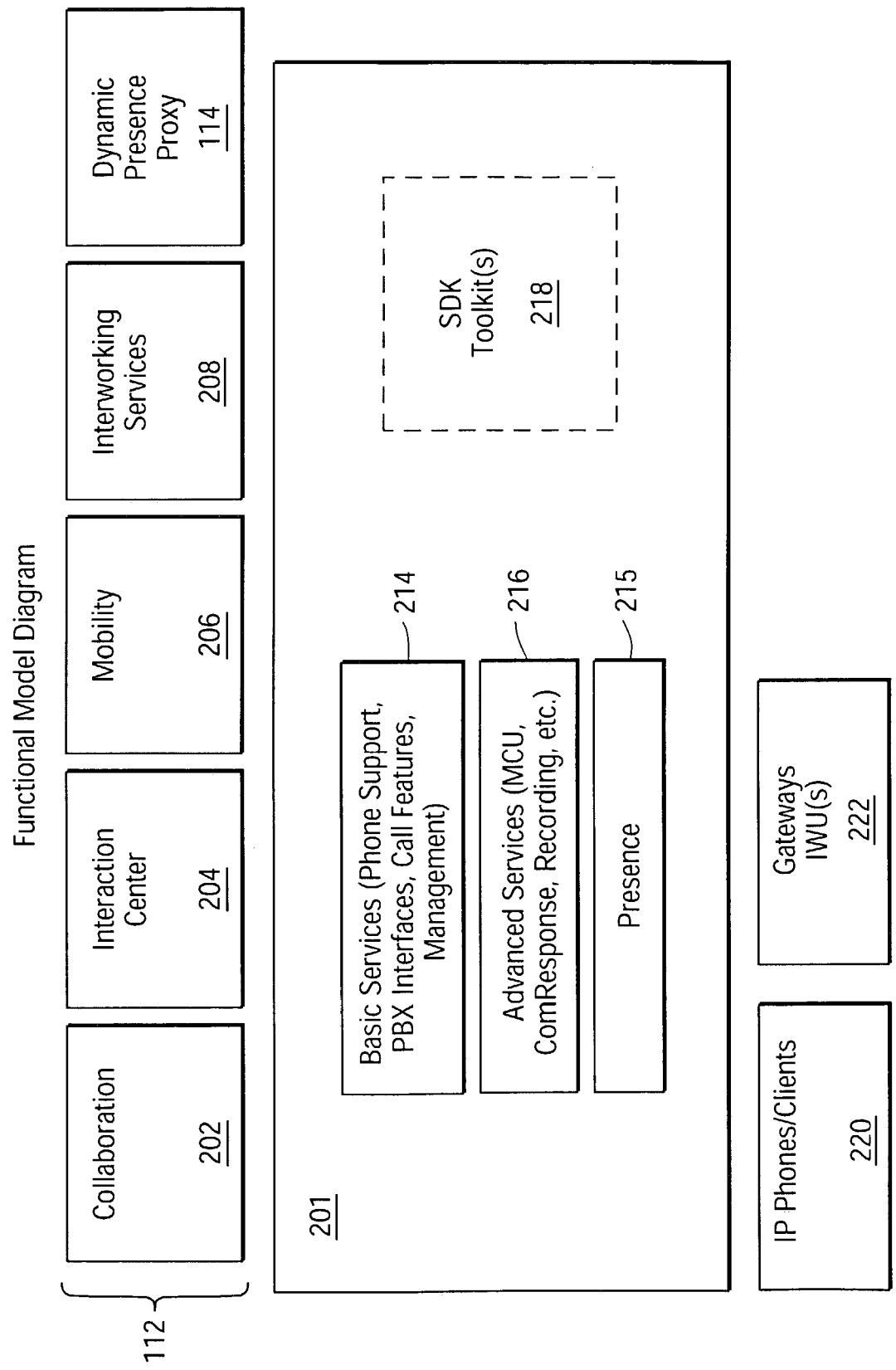
FIG. 6 is a diagram illustrating a telecommunications server according to an embodiment of the present invention.

As noted above, the dynamic presence proxy 1114 of embodiments of the present invention may be provided in a variety of network settings and degrees of integration with servers, and the like. FIGS. 5 and 6 illustrate an exemplary network configuration and server according to a particular embodiment of the present invention. It is noted, however, that operation of the dynamic presence proxy 1114 is generally similar to that discussed above.

As shown, the telecommunications system 100 of FIG. 5 includes a packet network such as a local area network (LAN) 102. The LAN 102 may be implemented using a Transmission Control Protocol/Internet Protocol (TCP/IP) network and may implement voice or multimedia over IP using, for example, the Session Initiation Protocol (SIP). Operably coupled to the LAN 102 is a multimedia server 104. The multimedia server 104 may include one or more controllers 101, which may be embodied as one or more microprocessors, and memory 103 for storing application programs and data.

The controller 101 can also implement an instant messaging system 106. The instant messaging system may be embodied as Microsoft Windows Messenger or AOL Instant Messenger or any other instant messaging system. The multimedia server 104 may also implement a presence server 215 in association with or distinct from the instant messaging system 106. In addition, according to embodiments of the present invention, a dynamic presence proxy 114 may be provided, which may be part of an interactive suite of applications 112, run by controller 101, and typically stored in memory 103, as will be described in greater detail below.

The dynamic presence proxy 114 is used to determine whether a user or a party to a call session is a presence user and transmit, or cause to be transmitted, presence updates to watchers of the user. Also connected to the LAN 102 is a gateway 116 which may be a telecommunications switch and may be implemented as a gateway to a private branch exchange (PBX) or the public switched telephone network (PSTN) 118, or any of a variety of other networks, such as a wireless or cellular network. In certain embodiments, the gateway 116 may be integrated with the multimedia server 104. In addition, one or more LAN telephones 120a-120n and one or more computers 122a-122n may be operably coupled to the LAN 102. The computers 122a-122n may be personal computers implementing an instant messaging/presence application; certain LAN telephones 120a-120n may also implement instant messaging and presence. The computers 122a-122n may include telephony and other multimedia messaging capability using, for example, peripheral cameras, microphones and speakers (not shown) or peripheral telephony handsets 124. In other embodiments, one or more of the computers may be implemented as wireless telephones, digital telephones, or personal digital assistants (PDAs). Thus, the figures are exemplary only. As shown with reference to computer 122a, the computers may include one or more controllers 129, such as Pentium-type microprocessors, and storage 131 for applications and other programs. Finally, the phones 120a-120n and computers 122a-122n and specifically, the controllers 129, may implement presence services 128a-128n according to embodiments of the present invention. The presence services 128a-128n may be implemented in conjunction with instant messaging applications 127a-127n and the presence server 215. The presence services 128 allow access to the presence server 215 of the multimedia server 104 and thus can receive updates of user status from the dynamic presence proxy 114.

Turning now to FIG. 6, a functional model diagram illustrating the dynamic presence proxy 114 is shown. More particularly, FIG. 6 is a logical diagram illustrating a portion of a particular embodiment of a multimedia server 104. The multimedia server 104 includes a plurality of application modules 112 and a communication module 201. The multimedia server 104 also provides interfaces, such as application programming interfaces (APIs) to IP phones/clients 220 and gateways/interworking units 222. Typically, such application modules are stored in memory 103 (FIG. 5) and executed by the controller 101 (FIG. 5). According to the embodiment illustrated, the broker module 201 includes a basic services module 214, a presence server 215, an advanced services module 216 and a toolkit module 218.

The basic services module 214 functions to implement, for example, phone support, PBX interfaces, call features and management. The phone support features allow maintenance of and access to buddy lists.

The advanced services module 216 implements function such as multipoint control unit (MCU), recording, and the like. MCU functions are used for voice and/or video conferencing and support ad hoc and dynamic conference creation from a watcher list following a conferencing model, such as the SIP/MMUSIC conferencing model, for ad hoc conferences. In certain embodiments, the MCU may take the form of a decomposed model, where the signalling portion of conferences are handled by a Multipoint Controller (MC) and the media portion of conferences are handled by one or more Multipoint Processors (MPs). Such a decomposed MCU model would make use of a generally available protocol to provide signalling control between the MC and the MPs (e.g. H.248). In certain embodiments, support for any number of audio codecs (e.g. G.711, G.723.1, ZG.722, G.729) and/or video codecs (e.g. H.261, H.263) would be provided by the MP or MCU.

The presence server 215 is adapted to maintain and update presence status in response to requests from the dynamic presence proxy 114. Thus, the presence server 215 functions as the presence manager unit 215a (FIG. 3) and a watcher list database manager unit 215b (FIG. 3) discussed above.

It is noted that, while shown as integrated with the multimedia server 104, the presence server 215 and/or the dynamic presence proxy 114 may also be implemented in a separate unit. Further, in other embodiments, either or both of the multimedia server 104 and the presence server 215 may be services provided on or via a PBX or PSTN 118 rather than provided on the LAN 102 (FIG. 5). Thus, the figures are exemplary only.

The presence server 215 may additionally provide device context for both IP registered devices and user-defined non-IP devices. Various user contexts, such as In Meeting, On Vacation, In the Office, etc., can be provided for. In addition, voice, e-mail and instant messaging availability may be provided across the user's devices. The presence server 215 enables real time call control using presence information (e.g., to choose a destination based on the presence of a user's devices). In addition, various components have a central repository for presence information and for changing and querying presence information.

Real time call control is provided by an IP phones/client module 220 associated with the basic services module 214. That is, calls can be intercepted in progress and real time actions performed on them, including directing those calls to alternate destinations based on rules and or other stimuli. The IP phones/client module 220 also provides call progress monitoring capabilities and for reporting status of such calls to interested applications. The IP phones/client module 220 also provides for call control from the user interface.

According to the embodiment illustrated, the application modules 112 include a collaboration module 202, an interaction center module 204, a mobility module 206, an interworking services module 208, and the dynamic presence proxy 114.

The collaboration module 202 allows for creation, modification or deletion of a collaboration session for a group of users. The collaboration module 202 may further allow for invoking a voice conference from any client. In addition, the collaboration module 202 can launch a multi-media conferencing package, such as the WebEx package. It is noted that the multi-media conferencing can be handled by other products.

The interaction center 204 provides a telephony interface for both subscribers and guests. A guest user is a user who has not authenticated as a subscriber. Subscriber access functions include calendar access and voicemail and e-mail access. The calendar access allows the subscriber to accept, decline, or modify appointments, as well as block out particular times. The voicemail and e-mail access allows the subscriber to access and sort messages. Similarly, the guest access feature allows the guest user to have access to voicemail for leaving messages and calendar functions for scheduling, canceling, and modifying appointments with subscribers. Further, the guest access feature allows a guest user to access specific data meant for them (e.g., receiving e-mail and faxes).

The mobility module 206 provides for message forwarding and "one number" access across media, and message "morphing" across media for the subscriber. Further, various applications can send notification messages to a variety of destinations, such as e-mails, instant messages, pagers, and the like. In addition, the subscriber can set rules that the mobility module 206 uses to define media handling, such as e-mail, voice and instant messaging handling. Such rules specify data and associated actions. For example, a rule could be defined to say "If I'm traveling, and I get a voicemail or e-mail marked Urgent, then page me."

As noted above, while illustrated as a single server, the presence server 215 may be separate from the multimedia server 104. In addition, it is noted that other server configurations are possible.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications method, comprising:

receiving a call from a user at a call facility;

providing an identification of the user from the call facility to a presence proxy;

using said presence proxy to monitor a condition of said call facility and for determining a presence of said identified user based on a condition of said call facility resulting from said call when said identified user is not logged in to an associated presence system;

determining if said identified user has a watcher list; and informing contacts on said watcher list that said identified user is available, said informing including providing an update of the presence status of the identified user when the user is not logged in to the presence system and without requiring the identified user to perform an independent log in to the presence system via a presence service application.

2. A telecommunications method in accordance with claim 1, wherein said watcher list comprises a presence system watcher list and said determining a presence occurs without said user logging in to said presence system.

3. A telecommunications method in accordance with claim 1, wherein said receiving a call comprises receiving a telephone call for a recipient at a telecommunications router.

4. A telecommunications system, comprising:

a telephone router configured to receive a call from a user and to provide an identification of the user;

a presence proxy configured to receive said identification from the telephone router; and a presence system including a presence database manager unit operably coupled to said telephone router and presence proxy and adapted to maintain one or more watcher lists of registered users;

wherein said presence proxy is configured to determine a presence status of the identified user, if the identified user is a registered user, by monitoring a condition of the router based on calls received at the router;

wherein said presence database manager unit is adapted to determine if such an identified user is maintained on a watcher list and transmit an update to parties associated with said watcher list of the presence status of the identified user responsive to a call made by the identified user when the identified user is not logged in to the presence system and without requiring the identified user to perform an independent log in to the presence system via a presence service application.

5. A telecommunications system in accordance with claim 4, further including an instant messaging manager unit.

6. A telecommunications system in accordance with claim 4, wherein said telephone router includes a calling number identification unit for determining an identity of a calling party.

7. A telecommunications system in accordance with claim 6, wherein said presence database manager unit is adapted to cross-reference an identity of a party received from said calling number identification unit and a list of system users.

8. A telecommunications server comprising:

a telecommunications controller for supervising a presence system and a telephone routing system and monitor a state of said telephone routing system including call status;

wherein said telephone routing system is configured to receive a call from a user and to provide an identification of the user to the presence system;

wherein said telecommunications controller is adapted to transmit presence status update information to registered users about the identified user based on said state when said identified user is not logged in the presence system and without requiring said identified user to perform an independent log in to said presence system via a local presence service application.

9. A telecommunications server in accordance with claim 8, wherein said presence system comprises an instant messaging system.

10. A telecommunications server in accordance with claim 9, wherein said presence status update information is transmitted via one or more presence control channels.

11. A telecommunications server in accordance with claim 10, wherein said telecommunications controller is adapted to determine whether said identified user has a watcher list in said presence system.

12. A telecommunications server in accordance with claim 11, wherein said telecommunications controller transmits said presence status update information to parties on said watcher list.

13. A telecommunications method, comprising:

receiving a call into a telecommunications system;

providing an identification of an associated caller from the telecommunications system to a presence proxy monitoring said telecommunications system;

determining in association with the presence proxy if said call originates from a registered user;

accessing, responsive to said determining, a watcher list associated with said identified user; and transmitting. updated presence information determined by said presence proxy about said identified registered user to parties associated with said watcher list;

wherein said determining and said transmitting occur when said identified registered user is not logged in to a presence system and without requiring said identified registered user to perform an independent log in to the presence system via a presence service application.

14. A telecommunications method in accordance with claim 13, wherein said presence system is an instant messaging system.

15. A telecommunications method in accordance with claim 14, wherein said transmitting occurs on an instant messaging control channel.

16. A telecommunications method in accordance with claim 13, further comprising determining if parties are authorized to receive said updated presence information.

17. A telecommunications method in accordance with claim 1, wherein said presence system is an instant messaging system.

18. A telecommunications method in accordance with claim 17, wherein said providing an update of the presence status of the user occurs on an instant messaging control channel.

19. A telecommunications method in accordance with claim 1, further comprising determining if parties are authorized to receive said update of the presence status of the user.

* * * * *